US008920925B2

(12) United States Patent
Gadkaree et al.

(10) Patent No.: US 8,920,925 B2
(45) Date of Patent: Dec. 30, 2014

(54) STABILIZED LITHIUM COMPOSITE PARTICLES

(71) Applicant: Corning Incorporated, Corning, NY (US)

(72) Inventors: Kishor Purushottam Gadkaree, Painted Post, NY (US); Xiaorong Liu, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 13/673,019

(22) Filed: Nov. 9, 2012

(65) Prior Publication Data

US 2014/0134438 A1 May 15, 2014

(51) Int. Cl.
*C09K 3/00* (2006.01)
*B22F 1/02* (2006.01)
*H01M 4/00* (2006.01)

(52) U.S. Cl.
CPC ... *C09K 3/00* (2013.01); *B22F 1/02* (2013.01); *H01M 4/00* (2013.01)
USPC ............................... 428/402.24; 427/126.1

(58) Field of Classification Search
CPC ................................................ C09K 3/00
See application file for complete search history.

(56) References Cited

U.S. PATENT DOCUMENTS

| | | | |
|---|---|---|---|
| 5,696,863 A | 12/1997 | Kleinerman | 385/123 |
| 6,183,911 B1 | 2/2001 | Kweon et al. | 429/224 |
| 6,201,685 B1 | 3/2001 | Jerabek et al. | 361/502 |
| 6,212,062 B1 | 4/2001 | Day et al. | 361/502 |
| 6,304,426 B1 | 10/2001 | Wei et al. | 361/502 |
| 6,487,066 B1 | 11/2002 | Niiori et al. | 361/502 |
| 6,565,701 B1 | 5/2003 | Jerabek et al. | 156/305 |
| 6,714,391 B2 | 3/2004 | Wilk et al. | 361/15 |
| 6,738,252 B2 | 5/2004 | Okamura et al. | 361/502 |
| 7,385,801 B2 | 6/2008 | Ando et al. | 361/503 |
| 7,443,651 B2 | 10/2008 | Ando et al. | 361/503 |
| 7,588,523 B2 | 9/2009 | Horner et al. | 492/13 |
| 7,588,623 B2 * | 9/2009 | Dover et al. | 75/332 |
| 2002/0176677 A1 | 11/2002 | Kumar et al. | 385/126 |
| 2004/0085710 A1 | 5/2004 | Takeuchi et al. | 361/502 |
| 2004/0253510 A1 | 12/2004 | De Jonghe et al. | 429/137 |

(Continued)

FOREIGN PATENT DOCUMENTS

EP 2 372 732 A1 10/2011

OTHER PUBLICATIONS

S.R. Sivakkumar, et al., "Evaluation of Lithium-Ion Capacitors Assembled with Pre-Lithiated Graphite Anode and Activated Carbon Cathode", Electrochimica Acta, 2012, vol. 65, pp. 280-287.
"Fiber Optics Give the Inside Story", *Advanced Composites Engineering*, Winter 1987, p. 17.

(Continued)

*Primary Examiner* — Randy Gulakowski
*Assistant Examiner* — Jeffrey Washville
(74) *Attorney, Agent, or Firm* — Michael W Russell

(57) ABSTRACT

Stabilized lithium particles include a lithium-containing core and a coating of a complex lithium salt that surrounds and encapsulates the core. The coating, which is a barrier to oxygen and water, enables the particles to be handled in the open air and incorporated directly into electrochemical devices. The coating material is compatible, for example, with electrolytic materials that are used in electrochemical cells. The average coated particle size is less than 500 microns.

18 Claims, 2 Drawing Sheets

(56) References Cited

U.S. PATENT DOCUMENTS

| | | | |
|---|---|---|---|
| 2006/0057433 A1 | 3/2006 | Ando et al. | 429/9 |
| 2007/0002524 A1 | 1/2007 | Ando et al. | 361/503 |
| 2008/0055819 A1 | 3/2008 | Taguchi et al. | 361/504 |
| 2008/0094778 A1 | 4/2008 | Tanizaki et al. | 361/504 |
| 2008/0165471 A1 | 7/2008 | Kojima et al. | 361/503 |
| 2008/0220329 A1 | 9/2008 | Kojima et al. | 429/188 |
| 2008/0273852 A1 | 11/2008 | Parker et al. | 385/128 |
| 2009/0023066 A1 | 1/2009 | Kojima et al. | 429/221 |
| 2009/0027831 A1 | 1/2009 | Tasaki et al. | 361/523 |
| 2009/0029257 A1 | 1/2009 | Ando et al. | 429/231.95 |
| 2009/0214949 A1 | 8/2009 | Ugawa | 429/199 |
| 2010/0221613 A1 | 9/2010 | Ueki et al. | 429/231.95 |
| 2011/0052129 A1 | 3/2011 | Sasaoka | 385/126 |
| 2011/0223491 A1* | 9/2011 | Xu et al. | 429/338 |
| 2012/0212879 A1 | 8/2012 | Li et al. | 361/502 |
| 2013/0122318 A1 | 5/2013 | Wietelmann | 428/472.3 |

OTHER PUBLICATIONS

T. Horiguchi, et al., "Measurement of temperature and strain distribution by Brillouin frequency shift in silica optical fibers", *SPIE*, vol. 1797, Distributed and Multiplexed Fiber Optical Sensors II, 1992, pp. 2-13.

J. Yu, et al., "Analysis of Brillouin Frequency Shift and Longitudinal Acoustic Wave in a Silica Optical Fiber With a Triple-Layered Structure", *Journal of Lightwave Technology*, vol. 21, No. 8, Aug. 2003, pp. 1779-1786.

T. Tjugiarto, et al., "Bandpass Filtering Effect in Tapered Asymmetrical Twin-Core Optical Fibres", *Electronics Letters*, Jun. 10, 1993, vol. 29, No. 12, pp. 1077-1078.

M.T.V. Wylie, et al., "Fiber Optic Distributed Differential Displacement Sensor", *Journal of Lightwave Technology*, Sep. 15, 2011, vol. 29, No. 18, pp. 2847-2852.

* cited by examiner

STABILIZED LITHIUM COMPOSITE PARTICLES

BACKGROUND

1. Field

The present disclosure relates generally to lithium materials, and more specifically to stabilized lithium composite particles that may be used in electrochemical energy storage devices.

2. Technical Background

Lithium metal is used in a wide variety of applications, including organometallic and polymer synthesis, and electrochemical devices such as rechargeable lithium batteries, ultracapacitors, and lithium-ion batteries. Such electrochemical devices may be utilized in many contexts, including in mobile electronic devices such as phones, tablets, and notebook computers, as well as in automobiles such as electric vehicles and hybrid vehicles. However, lithium metal in many forms is an unstable material that may ignite and burn in oxygen-containing environments, including air, or upon exposure to water or water vapor. Additionally, lithium fires are difficult to extinguish and may require dry powder fire extinguishers. Accordingly, lithium metal may have a short shelf life and may be dangerous to store.

In view of the foregoing, it would be desirable to develop stabilized lithium particles that may be utilized in an electrochemical device.

BRIEF SUMMARY

The concepts of the present disclosure are generally applicable to solid stabilized lithium composite particles that may be used in electrochemical devices. In accordance with one embodiment of the present disclosure, a stabilized lithium particle includes a core that comprises lithium metal and a coating that surrounds and encapsulates the core. The coating comprises a complex lithium salt. The composite particle has a particle size of about 500 microns or less.

A method for producing stabilized lithium particles comprises contacting lithium-containing particles with a coating solution that includes a complex lithium metal salt dissolved in a solvent, and removing the solvent to form particles that include a lithium-containing core and a lithium metal salt coating that surrounds and encapsulates the core.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
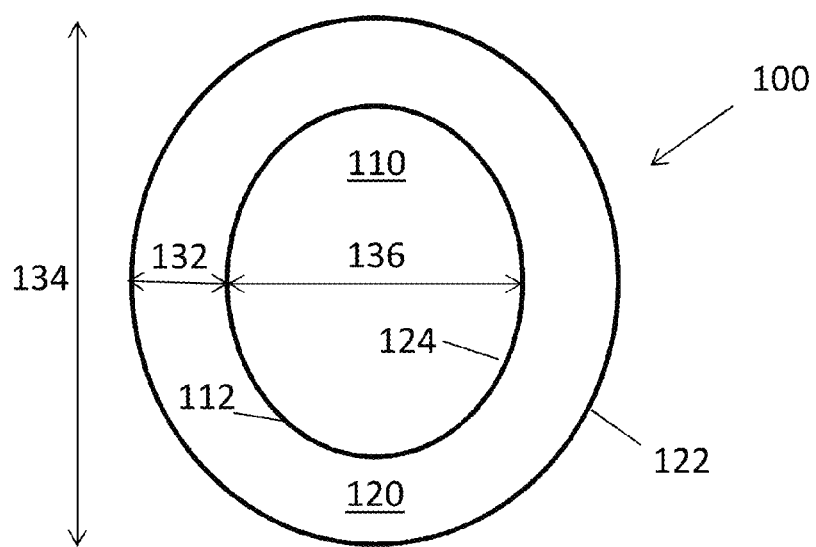
FIG. 1 is a schematic diagram of a cross-sectional view of a stabilized lithium composite particle according to various embodiments.

Reference will now be made in greater detail to various embodiments of the subject matter of the present disclosure, some embodiments of which are illustrated in the accompanying drawings. Whenever possible, the same reference numerals will be used throughout the drawings to refer to the same or similar parts.

The stabilized lithium particles described herein generally comprise a core and a coating that encapsulates the core. The core may comprise lithium metal or a lithium metal alloy. The coating, which comprises a lithium salt, surrounds and encapsulates the core. The coating may be hermetic and thus prevent or substantially inhibit water or air, including oxygen, from contacting and reacting with the core. Thus, in embodiments the composite particles are stabilized with respect to ambient exposure.

A single, stabilized lithium composite particle 100 is shown schematically in cross-section in FIG. 1. Particle 100 includes a core 110 and a coating 120 that completely surrounds and encapsulates the core. The core 110 may comprises a unitary body defining an outer surface 112. The coating 120 is in direct physical contact with the outer surface 112 of the core 110 along an inner surface 124 of the coating 120. The coating is inorganic and is free of organic species such as mineral oil.

The core 110 in some embodiments comprises elemental lithium metal. In further embodiments, the core may comprise an alloy of lithium. Examples of such alloys comprise lithium and one or more of Al, Si, Ge, Sn, Pb and Bi.

The coating 120 comprises a lithium salt that may include a complex lithium salt such as $LiPF_6$, $LiBF_4$, $LiClO_4$, $LiAsF_6$, or $LiF_3SO_3$, as well as mixtures thereof. A complex lithium salt is any ionic compound comprising lithium and an additional metal, metalloid or non-metal atom that does not itself ionize and which is soluble in an organic solvent. For instance, $LiPF_6$ contains lithium and phosphorus as metal atoms, but the phosphorus does not ionize by itself Rather, phosphorus ionizes as the $PF_6^-$ ion. In a further example, $LiBF_4$ contains lithium metal and the metalloid boron. Although lithium ionizes ($Li^+$), boron does not ionize by itself, but as the $BF_4^-$ ion. In a still further example, $LiClO_4$ contains lithium metal and the non-metal atoms chlorine and oxygen. The non-metal atoms ionize as the perchlorate ion ($ClO_4^-$).

Lithium salts, including complex lithium salts, may be used in lithium-ion batteries and lithium-ion capacitors as components of a liquid electrolyte. The lithium salts may be dissolved in a solvent to form an electrolyte solution for use in conjunction with an electrochemical device. Example solvents for forming an electrolyte include organic solvents or mixtures of organic solvents such as dimethyl carbonate, methyl propionate, ethylene carbonate, and propylene carbonate, as well as other solvents suitable for use in an electrolyte where the lithium ion is the charge carrier.

As illustrated in FIG. 1, the core 110 has a particle size 136, and the stabilized lithium particle 100 has a particle size 134. The term "particle size" is used to describe the maximum linear dimension associated with a particle. In the case of a spherical particle, for example, the particle size is the diameter. In the case of an oblong particle, the particle size is the "length" of the particle. An example average particle size for a plurality of composite particles 100 may range from about 5 microns to 500 microns, e.g., 5, 10, 20, 50, 100, 150, 200, 300, 400 or 500 microns, and may be defined for a given material batch over a range of any two of the aforementioned values.

The coating 120 has a thickness 132 defined as the average shortest distance between the inner surface 124 of the coating and the outer surface 122 of the coating. In embodiments, the coating may have a substantially uniform thickness or a variable thickness depending, for example, on the method used to form the coating. An example average thickness for the coating 124 may range from about 10 nm to 100 microns, e.g., 0.01, 0.02, 0.05, 0.1, 0.2, 0.5, 1, 2, 5, 10, 20, 50 or 100 microns, which may be defined for a given material batch over a range of any two of the aforementioned values.

In some embodiments, the stabilized lithium composite particle 100 may be substantially spherically shaped. However, other shapes are contemplated herein, such as, but not limited to asymmetric shapes or spheroids.

The stabilized lithium composite particles 100 are substantially non-reactive or non-combustive if exposed to air, oxygen or water. The coating 120 encapsulates the lithium core 110 to substantially inhibit or prevent exposure and reaction of the lithium with ambient gases or liquids. The stabilized lithium composite particles 100 may be substantially chemically inert, for example, to ambient exposure or to elevated temperature (e.g., 50° C., 100° C., 150° C. or even 200° C.) exposure to air, oxygen or water vapor. The stabilized lithium composite particles may be sufficiently stable to be stored in air for at least one week, 2 weeks, 1 month, or even a year without substantial chemical degradation and/or combustion.

Stabilized lithium composite particles may be produced by providing lithium metal particles, and contacting the lithium metal particles with a coating solution that includes a coating material dissolved in a solvent. The coating material may include a lithium salt or complex lithium salt as described above. The contacting may be performed by immersing the particles in the solution or by other means such as spray coating. After coating the particles, the solvent is removed to form a layer of the coating material over the lithium metal particles. Removal of the coating solvent may be performed by evaporation.

Due to its high reactivity and flammability, lithium metal is commonly stored under the cover of a viscous hydrocarbon such as mineral oil. While the mineral oil encapsulant inhibits degradation of the lithium metal, it is generally incompatible with most solid state devices. With the present stabilization approach, the lithium particles are safe to handle and store, and can be incorporated into a lithium ion device directly in their stabilized form.

In an embodiment, stabilized lithium composite particles may be produced by initially providing lithium metal or lithium metal-containing particles that are immersed in mineral oil. Prior to forming the inorganic coating over the particles, the mineral oil is stripped from the particles. By way of example, the mineral oil may comprise silicone oil. Lithium metal particles suspended in silicone oil are commercially available from Sigma-Aldrich of St. Louis, Mo.

Mineral oils such as silicon oil may be removed from the lithium particles by washing with a suitable cleaning solvent such as tetrahydrofuran (THF) or methylene chloride. A vacuum filtration system, for example, may be used to wash the lithium particles. Due to the volatility of the lithium, both the washing to remove an organic encapsulant and the act of contacting the lithium metal particles with a coating solution comprising a lithium metal salt to form the inorganic encapsulant can be carried out in a controlled atmosphere such as a glove box that is free or substantially free of oxygen and water. Prior to contacting the lithium metal particles with a coating solution, the washed lithium particles can be dried. The washed particles can be dried by heating the particles to evaporate the solvent, e.g., up to a drying temperature of about 100° C.

To form the inorganic coating, a lithium salt is initially dissolved in a coating solvent to form a coating solution. Suitable solvents are capable of dissolving the lithium salt. Example coating solvents include THF, n-methyl pyrrolidone (NMP), methylene chloride, or combinations thereof.

After contacting the lithium particles with the coating solution, the coating solvent can be removed to form a coating of the lithium salt over the particles. The solvent may be removed by evaporation, which may either occur naturally under environmental conditions of the preparation process or may be forced through various techniques including vacuum techniques. For example, THF may be liberated through evaporation at room temperature and with no vacuum. In a further example, NMP may be removed by heating optionally with the application of vacuum. In various embodiments, removal of the coating solvent may be performed at room temperature or by heating to a temperature of at most about 150° C., e.g., about 30, 50, 75 or 100° C.

The thickness 132 of the coating 120 may be determined by controlling the concentration of the lithium salt in the coating solution. Generally, a higher salt content in the solution will produce a thicker coating. A concentration in the coating solution of the lithium salt may range from about 0.1 to 4 molar, e.g., 0.1, 0.2, 0.5, 1, 2, 3 or 4 molar. In embodiments, the coating solution comprises a saturated solution of the lithium salt.

In the resulting stabilized lithium composite particles, the lithium salt coating may comprise from about 1 to 50 wt. % of the total mass of the particles. For instance, the coating may comprise 1, 2, 5, 10, 20, 30, 40 or 50 wt. % of the total mass. Together with the composition, this thickness of the coating is chosen to provide an effective barrier to the diffusion of air, oxygen and water.

Additional aspects of the stabilized lithium composite particles and methods for forming them are disclosed in the following non-limiting examples.

Example 1

Lithium metal particles in silicone oil were first washed and filtered with THF under controlled atmosphere to remove the silicone oil. The particles were dried and transferred to a dish containing a 2M coating solution of $LiPF_6$ dissolved in THF. The solvent evaporates quickly under ambient conditions to produce stabilized, $LiPF_6$-coated lithium composite particles. The amount and concentration of the coating solution was controlled to produce composite particles where, upon drying, the weight ratio of $LiPF_6$ (coating) to lithium metal (core) is about 20:80.

Figure 2A:
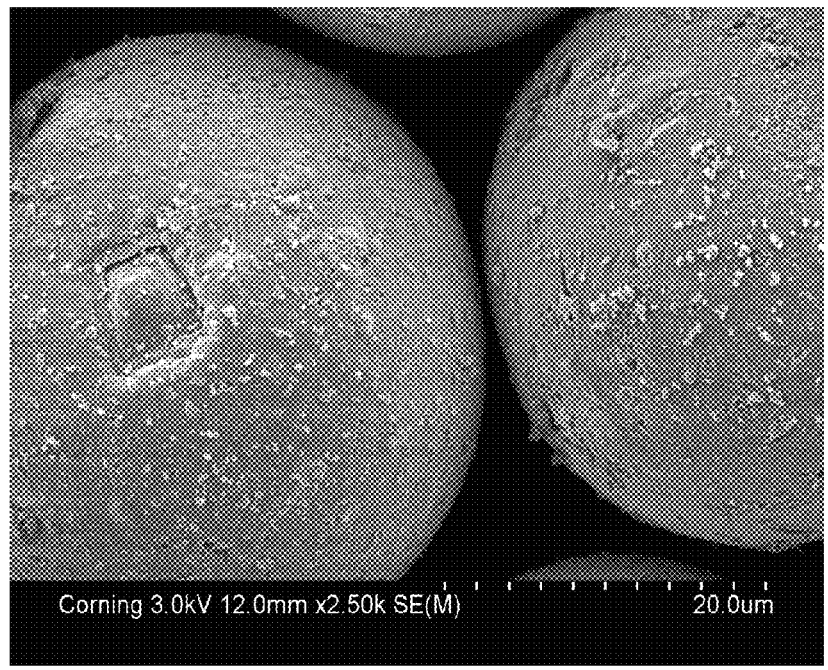
FIGS. 2A and 2B are SEM micrographs of $LiPF_6$-coated lithium metal particles according to one embodiment.
Figure 2B:
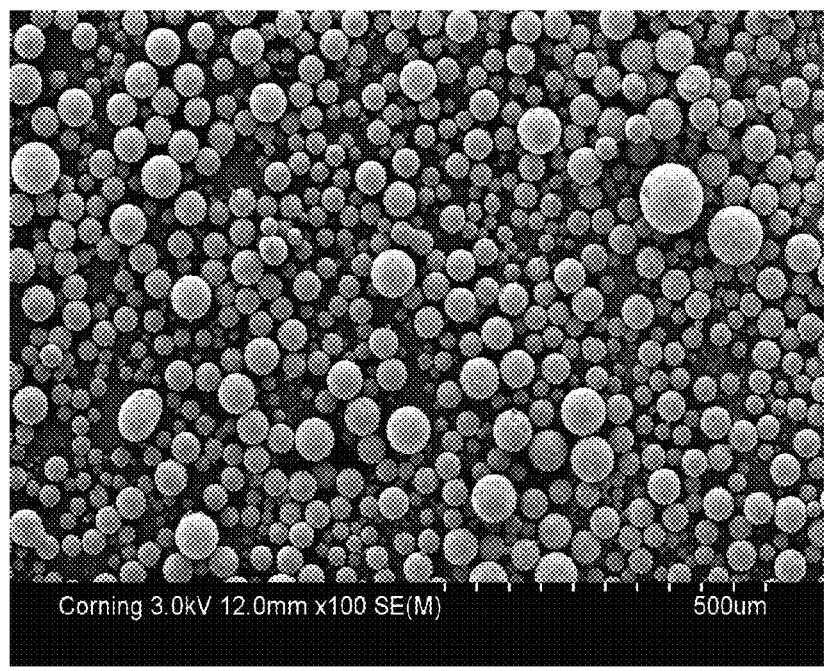

SEM micrographs of the coated particles are shown at high and low magnifications respectively in FIGS. 2A and 2B. Micrographs of the uncoated particles are not available due to their highly pyrophoric nature. In a 1 week evaluation, the coated particles remained stable at room temperature in air. In a further evaluation, the coated particles exhibited no reaction following overnight exposure in an oven at 150° C.

Example 2

The example 1 experiment was repeated except using NMP as the solvent for $LiPF_6$. The sample was dried at 120° C. in a vacuum oven to remove the NMP. The resulting powder displayed comparable air stability to example 1.

Example 3

Figure 3:
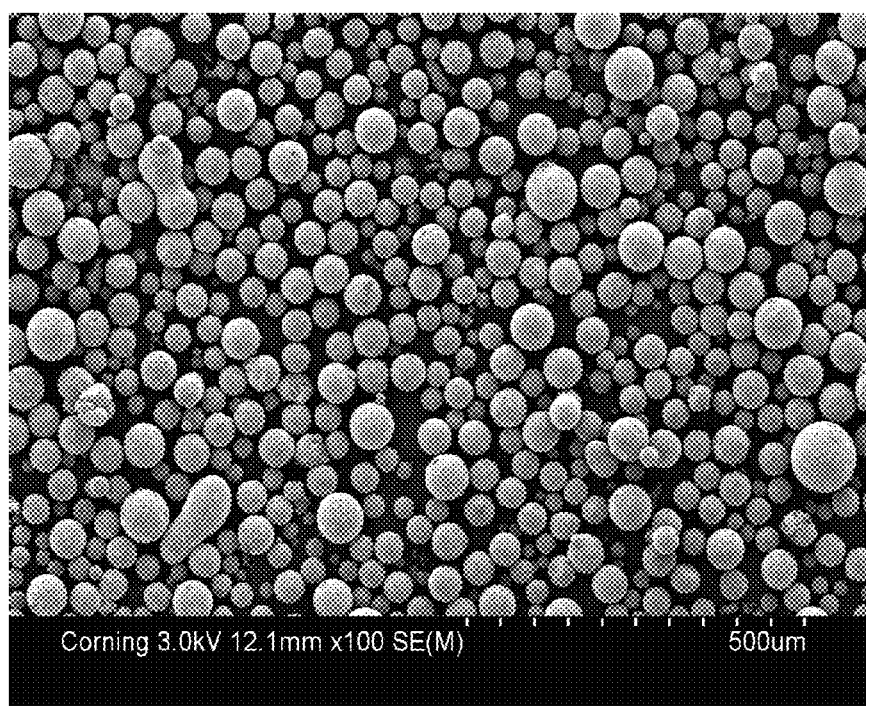
FIG. 3 is an SEM micrograph of $LiPF_6$-coated lithium metal particles according to a further embodiment.

The coating experiment was repeated with methylene chloride as solvent for $LiPF_6$ and results similar to examples 1 and 2 were obtained. An SEM micrograph of the coated particles is shown in FIG. 3.

As used herein, the singular forms "a," "an" and "the" include plural referents unless the context clearly dictates otherwise. Thus, for example, reference to a "particle" includes examples having two or more "particles" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a glass substrate that comprises a glass material include embodiments where a glass substrate consists of a glass material and embodiments where a glass substrate consists essentially of a glass material.

It will be apparent to those skilled in the art that various modifications and variations can be made to the present disclosure without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A stabilized lithium metal particle comprising a core and a coating that surrounds and encapsulates the core, wherein:
    the core comprises lithium;
    the coating comprises a complex lithium salt; and
    the composite particle has a particle size of about 500 microns or less,
    wherein the complex lithium salt is selected from the group consisting of $LiPF_6$, $LiBF_4$, $LiClO_4$, $LiAsF_6$, $LiF_3SO_3$ and combinations thereof.

2. The stabilized lithium composite particle of claim 1, wherein the core consists essentially of elemental lithium metal.

3. The stabilized lithium composite particle of claim 1, wherein the composite particle has a particle size of about 200 microns or less.

4. The stabilized lithium composite particle of claim 1, wherein the coating has an average thickness of between about 0.01 to 100 microns.

5. The stabilized lithium composite particle of claim 1, wherein the coating has an average thickness of between about 1 to 50 microns.

6. The stabilized lithium composite particle of claim 1, wherein the composite particles comprise between about 1 to 50 wt. % lithium salt.

7. The stabilized lithium composite particle of claim 1, wherein the particle is substantially spherically shaped.

8. The stabilized lithium composite particle of claim 1, wherein the particle is substantially chemically inert in an ambient environment comprising oxygen and/or water vapor.

9. A stabilized lithium particle consisting essentially of a core and a coating that surrounds and encapsulates the core, wherein:
    the core comprises lithium;
    the coating comprises a complex lithium salt; and
    the composite particle has a particle size of about 500 microns or less.

10. A process for producing stabilized lithium particles, the process comprising the acts of:
    providing lithium-containing particles;
    contacting the particles with a coating solution comprising a complex lithium metal salt dissolved in a solvent; and
    removing the solvent to produce stabilized particles comprising a lithium-containing core and a coating comprising the lithium metal salt surrounding and encapsulating the core, wherein the complex lithium salt is selected from the group consisting of $LiPF_6$, $LiBF_4$, $LiClO_4$, $LiAsF_6$, $LiF_3SO_3$ and combinations thereof.

11. The process of claim 10, wherein the core consists essentially of elemental lithium metal.

12. The process of claim 10, wherein the solvent is selected from the group consisting of THF, NMP and methylene chloride.

13. The process of claim 10, wherein a concentration of the lithium salt in the coating solution ranges from about 0.1 to 4 M.

14. The process of claim 10, wherein the acts of contacting and removing are performed at a temperature of less than about 150° C.

15. The process of claim 10, wherein the solvent is removed by evaporation.

16. The process of claim 10, further comprising washing the lithium-containing particles with a cleaning solvent prior to contacting the particles with the coating solution.

17. The process of claim 16, wherein the cleaning solvent is selected from the group consisting of THF and methylene chloride.

18. The stabilized lithium composite particle of claim 1, wherein the coating has an average thickness of between about 0.2 to 100 microns.

* * * * *